United States Patent [19]
Mayhew

[11] Patent Number: 5,933,596
[45] Date of Patent: Aug. 3, 1999

[54] MULTIPLE SERVER DYNAMIC PAGE LINK RETARGETING

[75] Inventor: David Evan Mayhew, Cary, N.C.

[73] Assignee: International Business Machines Corporation, Armonk, N.Y.

[21] Appl. No.: 08/803,055

[22] Filed: Feb. 19, 1997

[51] Int. Cl.⁶ .................................................. G06F 13/00
[52] U.S. Cl. ...................................................... 395/200.33
[58] Field of Search ...................... 364/DIG. 1 MS File, 364/DIG. 2 MS File; 395/180, 182.02, 182.04, 200.3, 200.31, 200.32, 200.33, 200.47, 200.48, 675; 711/100

[56] References Cited

U.S. PATENT DOCUMENTS 5,774,660  6/1998  Brendel et al. ..................... 395/200.31

*Primary Examiner*—Robert B. Harrell
*Attorney, Agent, or Firm*—Jeanine S. Ray-Yarletts

[57] ABSTRACT

A method for distributing the workload among multiple replicated servers in multiple server banks within a computer network, preferably an Internet environment utilizing web pages and web servers, whereby the only changes are to the process or the code reside on the web server and there is no reduction in availability of the resources.

8 Claims, 8 Drawing Sheets

MULTIPLE SERVER DYNAMIC PAGE LINK RETARGETING

BACKGROUND OF THE INVENTION

The World Wide Web is becoming the method of choice for searching for information, doing business, and is even becoming a viable means of socializing with others. The popularity of the World Wide Web has put unexpected demands on the systems which support and sustain the Web such that, many times, the performance of the Web is impacted. As more and more people attempt to access the same web sites or traverse the same links, the links and web sites become congested. The congestion causes the response time to the user to increase. This increase in response time increases the cost to the users as well as frustrating users. When a web site becomes too congested, users will start finding alternative web sites that have better performance. This is extremely undesirable to the owners of the web sites who, in some instances, receive revenue based on the number of users accessing their site.

Creators of the web sites have attempted to solve this problem by creating multiple instances of a web site and having users link to these multiple instances. While this sounds like a good solution, it is not without problems. Since web sites must be accessed by their name, the owner of the site must distribute different names to the different users and have them access the different instances of the same information. This is shown in FIG. 1. The management of the different names becomes complicated in that the owner of the site must determine who will be likely to be accessing the site at any given time and distribute them evenly over the multiple instances of the information. The site owner must distribute the names such that the load on each of the multiple servers that support the information remains relatively even or risk encountering the same problems that they would if there was only one server. In addition, the method of distributing the name of different web sites to different users results in some users not being able to access the information if one of the alternative sites goes down. Since the user only knows one name where the location may be found, they will lose access if their server is the one that goes down while other servers having access to the identical information remain active.

Additional confusion results if a user discovers the multiple locations of the information. The user may become confused as to which information is "current".

Others have tried to solve the problem of web site load balancing by using Web Sprayers. A web sprayer is an intermediate server which is connected to multiple other servers. Each of the multiple servers to which the sprayer is connected contains the same information, replicated. Anyone trying to access the information on the multiple servers must access the information through the sprayer. The sprayer receives the request for the information, determines which of the multiple servers to send the next request to, and sends the request to the appropriate secondary server. This can also be implemented as a simple round-robin serving approach to distribute the work between the multiple data servers. This approach, while useful to improve the performance in general, has some significant drawbacks in that if the sprayer goes down or malfunctions access to the information is lost. The different secondary servers cannot be accessed without the sprayer. In addition, the current implementations of the sprayers have no means of determining how busy each of the secondary servers is. Someone making a single request of a server taking only a few seconds is treated the same as someone making a request which takes an hour. This can lead to some imbalancing of the secondary server workload, although it is definitely a significant performance improvement over having a single server.

RELATED APPLICATIONS

This application is related to copending application Ser. No. 08/808,974 filed on Feb. 19, 1997 entitled Dynamic Page Link Retargeting and assigned to IBM Corporation.

OBJECTS OF THE INVENTION

It is an object of the present invention to provide a means for improving the performance of accessing popular web sites where there are more than one server set, each server set containing multiple alternative web servers with information replicated among them.

It is a further object of the present invention to improve the performance of the above mentioned servers without making changes to the web browser needed to access the information.

If is a further object of the present invention to improve the performance of the above mentioned server without requiring any additional hardware.

It is a further object of the present invention to minimize the cost associated with providing high availability of web sites, those costs including hardware costs administration costs, configuration costs and maintenance costs.

Another object of the present invention is to provide a highly scalable solution so that the same solution can be used for web sites of all sizes.

These and other objectives are met by the present invention.

SUMMARY OF THE INVENTION

The present invention involves the use of hyper-text transfer protocol (http) links which are contained within web pages to facilitate load balancing across multiple servers containing the same information. The present invention, called multiple server dynamic page link retargeting (MS/DPLR), uses the links in the web pages to load balance across multiple banks of available servers rather than relying on special purpose front end processors for load balancing. MS/DPLR eliminates the need for special hardware or special organization of the existing hardware and allows each bank of web servers to operate independently. This provides higher availability through failures of individual web servers. In addition, this solution is lower cost than other known solutions to the problem. MS/DPLR requires no special configuration and is more easily scalable than a web sprayer solution to load balancing across web servers.

DETAILED DESCRIPTION OF THE PREFERRED EMBODIMENT

Figure 1:
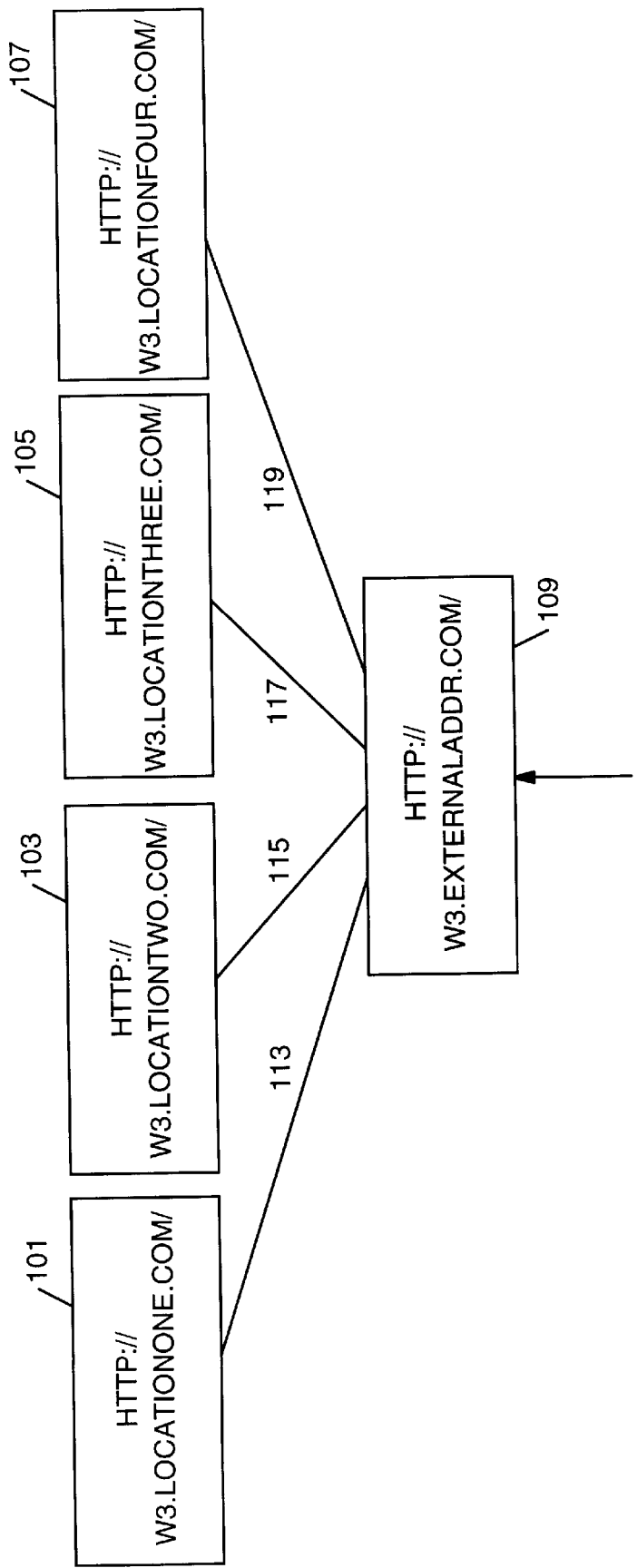
FIG. 1 is a pictorial representation of a sprayer functioning in a web environment.

One of the most recent solutions to the problem of the inability of web servers to satisfy the multitude of requests received in a timely manner is a web sprayer. FIG. 1 depicts a web sprayer. In the web sprayer environment, the user accesses the desired information by addressing the web sprayer (109). In the present example the user would address the information by referencing http:\\w3.externa1addr.com\xxxx.xxxx where 'xxxx.xxxx' is the specific information being requested. Once the web sprayer (109) receives the information, the sprayer sends the request for information to one of the attached data servers. The first request received is sent over the first link (113) to the first data server (101) by converting the address requested to http:\\w3.locationone.com\xxxx.xxxx, the second request for information is sent over the second link (115) to the second data server (103) by converting the address requested to http:\\w3.locationtwo.com\xxxx.xxxx, the third request for information is sent over the third link (117) to the third data server (105) by converting the address requested to http:\\w3.locationthree.com\xxxx.xxxx, and the fourth request for information is sent over the fourth link (119) to the fourth data server (107) by converting the address requested to http:\\w3.locationfour.com\xxxx.xxxx. When further requests for data are received, the process begins again with the first data server in a round robin fashion. This method enables more requests to be handled with a better response time perceived by the user and without requiring the user to know multiple, alternate data locations but also has significant drawbacks. First, some sprayers require specialized hardware that will not handle any of the load of satisfying requests to the user while other web sprayers will process web pages but with a possible impact to the performance of that server. Both types of sprayers require specialized knowledge to appropriately configure the sprayer and specialized software to implement the sprayer functions. Second, if the data server to which the user is assigned fails or the link between the data server and the sprayer fails, there is no way for the user to continue other than to reissue a request to the sprayer. In addition, the round robin method of request distribution does not take into account the length of time a user will access the data server, therefore, it can cause an imbalance in the load distribution. Finally, if the web sprayer goes down, none of the servers are accessible under this solution.

Figure 2:
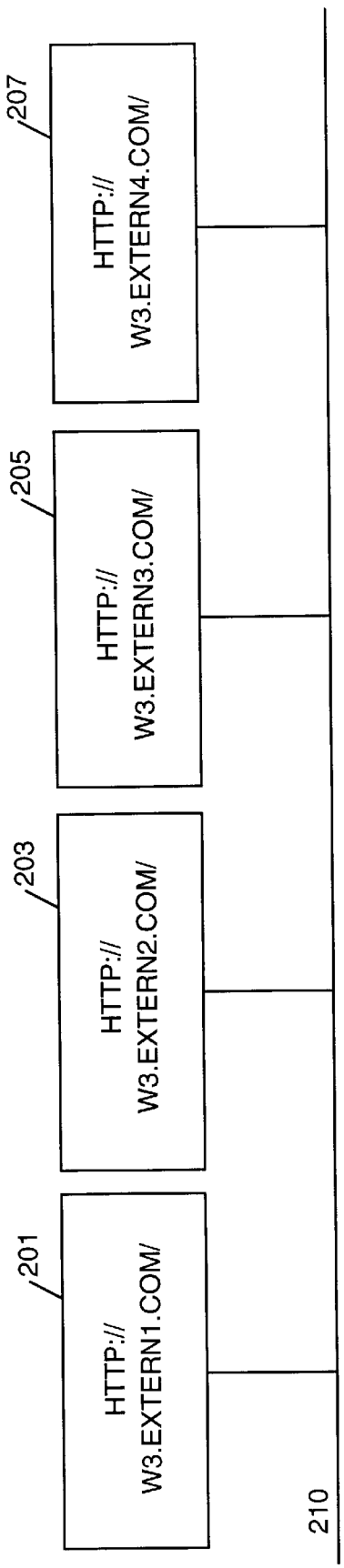
FIG. 2 is a pictorial representation of multiple, alternate web servers each accessed by name.

FIG. 2 depicts another, less desired, alternative to the problem of satisfying the volume of requests for information directed to web servers. FIG. 2 shows a telecommunications link (210) which has four alternate servers containing replicated information. As users request a route to the desired information, they are told different addresses. Some of the users which request access to the information are told that it is at a first data server (201) at address http:\\w3.externl.com\xxx.xxx, some of the users which request access are told that the information is at a second data server (203) at address http:\\w3.extern2.com\xxx.xxx, some of the users which request access are told that the information is at a third data server (205) at address http:\\w3.extern3.com\xxx.xxx, and the remainder of the users which request the information are told that it is at a fourth data server (207) at address http:\\w3.extern4.com\xxx.xxx. While this approach is relatively simple to implement and requires no hardware changes or configuration, it does have significant drawbacks. This solution does not provide load balancing. It may distribute the information as to where the desired data is located in a uniform manner, but does nothing to distribute the actual accesses or attempts to access data. In addition, there is no allowance made for one data server to back-up another data server should one or more of the data servers fail. For example, if a user was told that the information they requested was at http:\\w3.extern2.com\xxx.xxx and the data server w3.extern2.com failed, then the user would not know to look elsewhere for the information and this solution does not provide an automatic rerouting mechanism. In addition, users trying to share information can become extremely confused when one user believes that the information comes from http:\\w3.exten1.com\xxx.xxx and another user believes that the information comes from http:\\w3.extern4.com\xxx.xxx. There could be concerns as to where the most current information is located, etc.

Figure 3:
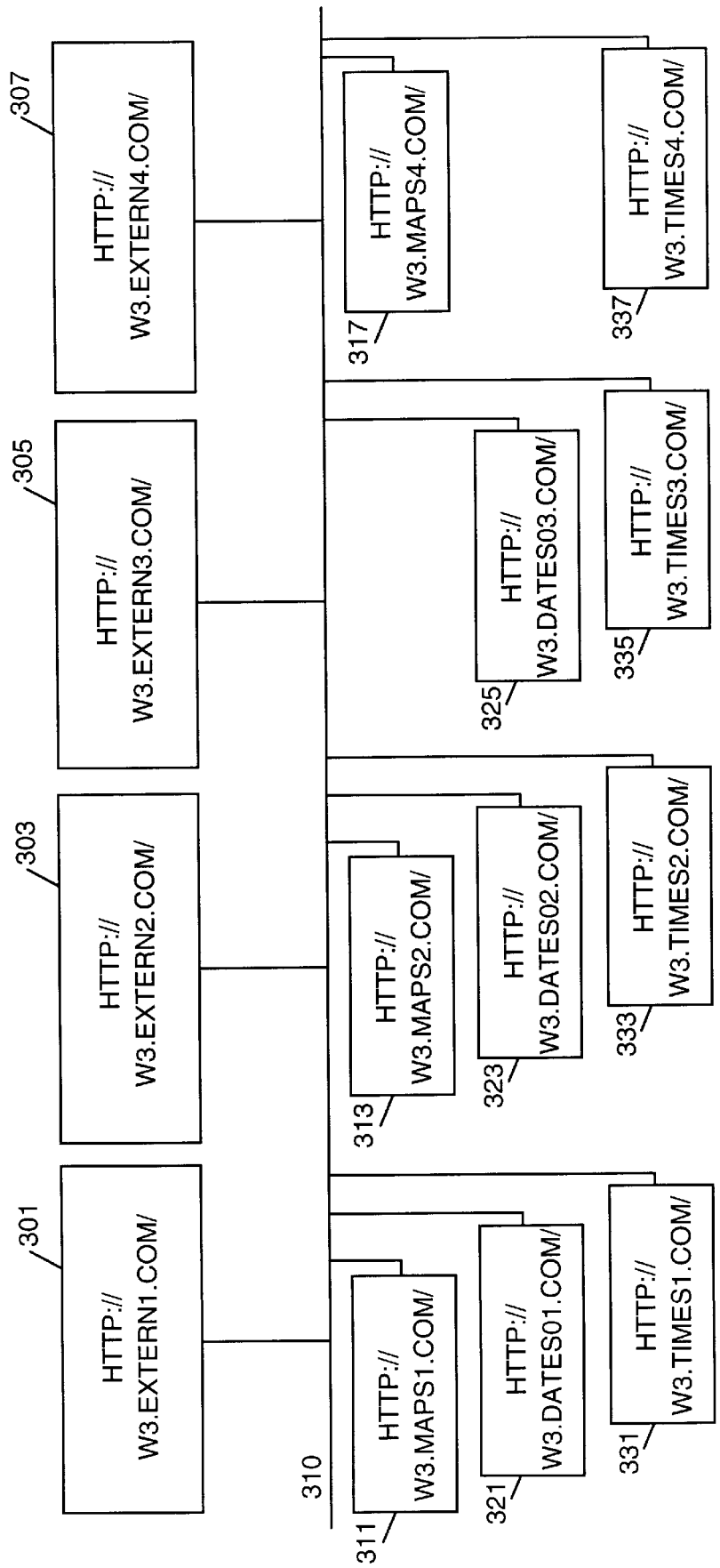
FIG. 3 is a representation of the present invention using named servers and three alternate servers for each of the named servers.
Figures 6A, 6B:
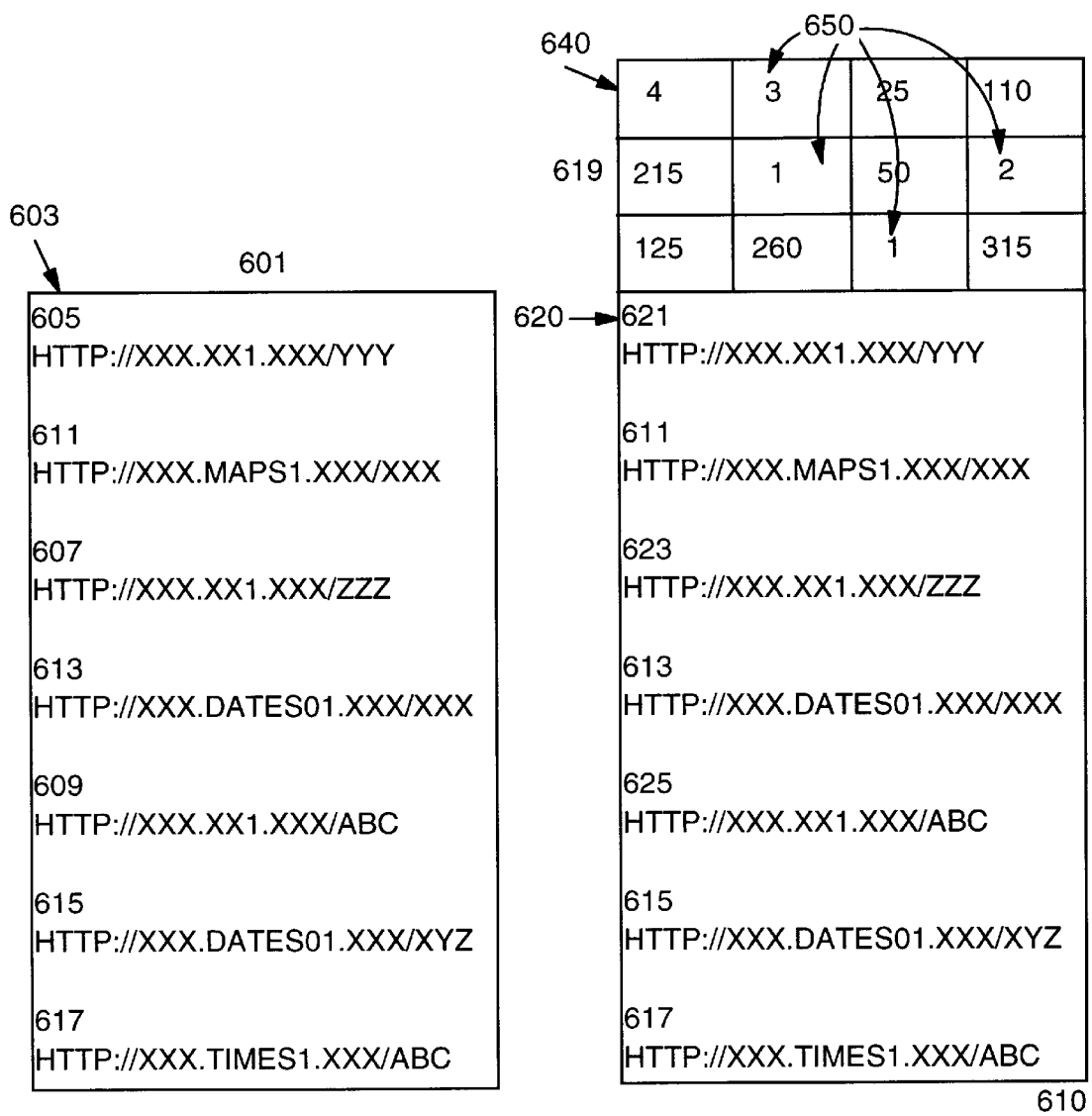
FIG. 6A is a graphical representation of a web page prior to implementing the present invention.
FIG. 6B is a graphical representation of a web page after implementing the present invention.

FIG. 3 shows the network of the present invention which takes advantage of the fact that information on the web may contain a multitude of pointers (or links) to other information contained within the same, and different, web servers. The present invention addresses the access to information within the same web server as well as other web servers having alternate banks of information. As is obvious from the figure, the present invention requires no specialized or additional hardware. The user accesses the desired information by accessing http:\\w3.externl.com\xxx.xxx (301) over the communications link (310). This page contains links to other pages residing on w3.extern1.com as well as links to information residing on other pages an example of which is shown in FIG. 6A. The initial reference allows for a single interface to the information. As the information access is satisfied, the data server checks to see if the requested data server is 'busy'. Busy can be defined by the systems administrator to be the appropriate level of usage for that system. If the requested data server is busy, an internal data structure of alternate server locations is used to substitute the alternate servers for the requested data server in any page references within the information sent to the user. This results in future accesses by the user being to one of the alternate data servers while maintaining a single point of interface for the user. Using this example, a user may access web page http:\\w3.extern1.com\xxx.xxx which has references to w3.extern1.com\xxx.yyy, w3.externl.com\xxx.zzz, and w3.externl.com\qqq.xxx. When the page is sent to the requester and the 'exten1' (301) data server is busy, the user may receive the web page http:\\w3.extern1.com\xxx.xxx with links to http:\\w3.extern2.com\xxx.yyy, http:\\w3.extern2.com\xxx.zzz and http:\\w3.extern2.com\qqq.xxx for further information. This analogy is applicable to all of the servers that have alternates available. Hence, when the user follows any of its internal links to what was originally 'externl', it will be accessing the 'extern2' (303) server. A similar scenario is followed for accessing any of the alternate servers available for the links referenced within the web page being accessed.

The preferred embodiment of the present invention is implemented by executing a preprocessor against the web pages. This preprocessor, which resides on a web server, appends a header at the beginning of each web page to indicate a count of the number of servers referenced within the web page, a count of the number of links contained within the web page and a value to indicate the location or offset of each link to a web page contained within the selected page. In parallel, a data structure is created containing the lists of alternate servers available for each of the named servers in the web page. The easiest and most straight forward method of accomplishing this is to adopt a convention whereby the servers are named sequentially, for example if there are 50 alternative servers they are named 'abcd.xyz01.aaa' to 'abcd.xyz50.aaa'. If this convention is adopted, the pointer in the header appended by the preprocessor contains the offset to the replaceable numeric portion of the server name. As the implementation of the present invention proceeds and the determination is made that the primary server is busy, the process indexes through the linked list of alternate servers and only the two numeric digits are replaced. This also simplifies the data structure containing references to the alternate web servers in that it allows the fields of the data structure to only contain the two replaceable numeric digits rather than the entire server name.

FIG. 6A is a graphical representation of a web page before it has gone through the preprocessor. There is a pointer (603) to the beginning of the web page (601). Within the web page are links (605, 607, 609) to additional web pages within the same server as the requested web page (601). There are also links to additional web pages (611, 613, 615, 617) which are not contained within the same web server.

FIG. 6B is a graphical representation of the same page as FIG. 6B after it has been preprocessed as in the present invention. The web page (610) now contains a header (619). The header (619) of the present example contains a count (640) of the number of web servers referenced from the requested page and a count (650) for each of the web servers referenced of the number of links contained within the processed web, page. Following the count of the number of links is a reference to each of the offsets of the page links in the processed page. The pointer to the start of data (620) and the links to the other web pages remain unchanged.

The above mentioned preferred embodiment is not meant to limit the invention in any manner. The invention could be implemented using a flag to indicate the end of the header, pointers to the end of the header or the beginning of the data, or any other manner of indexing information.

Figure 4:
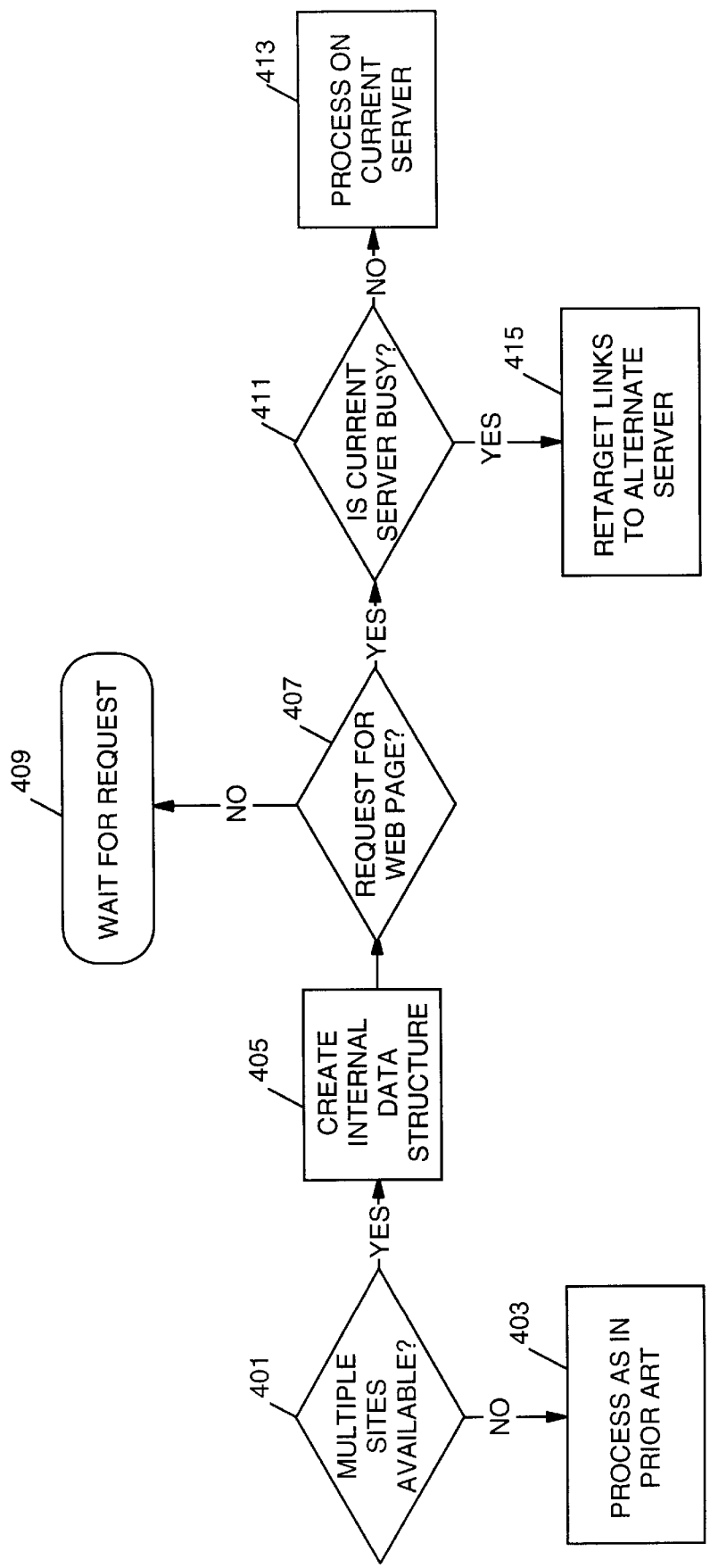
FIG. 4 is a flow chart of the present invention.

FIG. 4 further explains the concept of the present invention by way of a flow chart. When a web site implementing the present invention is established for each of the server references contained within the web page, first a check is made to determine if there are multiple alternative sites available (401). If there are not multiple alternative sites available, the information is processed as it was in the prior art (403). If there are multiple alternative sites available, an internal data structure (in the preferred embodiment this is a linked list although any data structure can be used) is created of alternative servers (405). This internal linked list is stored on the primary data server. Next a check is made to determine whether a request for a web page located on the primary data server has been received (407). If no request has been received, the server waits for a request (409). If a request for a web page located on the primary data server has been received, a check is made to determine if the primary data server is 'busy' (411). If the primary data server is not busy, then the request is processed entirely on the primary data server (413). If the primary data server is busy, the internal linked list of alternate servers is used to substitute the references to the primary data server with one of the alternate data servers (415). This results in all of the internal links or references to the primary data server in the page returned to the user being replaced by the address of an alternative data server which, in effect, off-loads the primary data server without impacting the user interface. This same principle is applied to each of the primary data servers referenced by the accessed web page.

In the preferred embodiment of the present invention, the server would process the header of the web page and, for each reference to the primary data server (as indicated by the list of offsets of page links) encountered, the primary data server would be replaced by an alternate data server prior to sending the page to the browser.

Figure 5A:
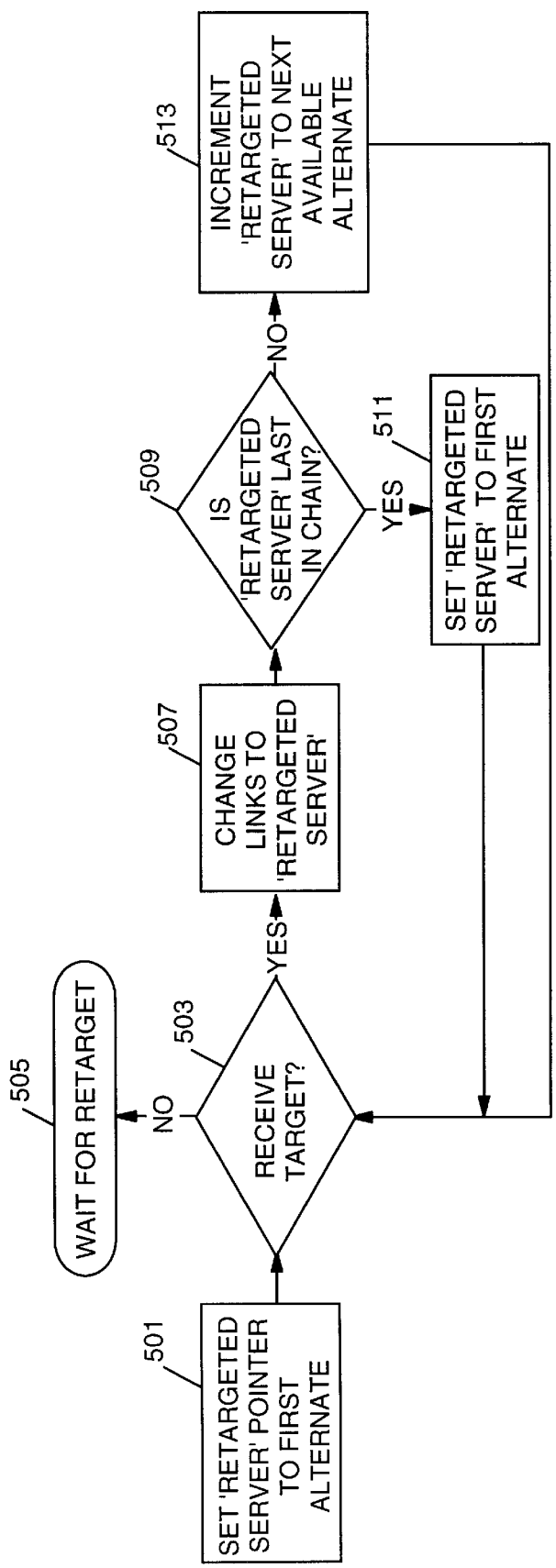
FIG. 5A is a flow chart of a round robin method of retargeting.
Figure 5B:
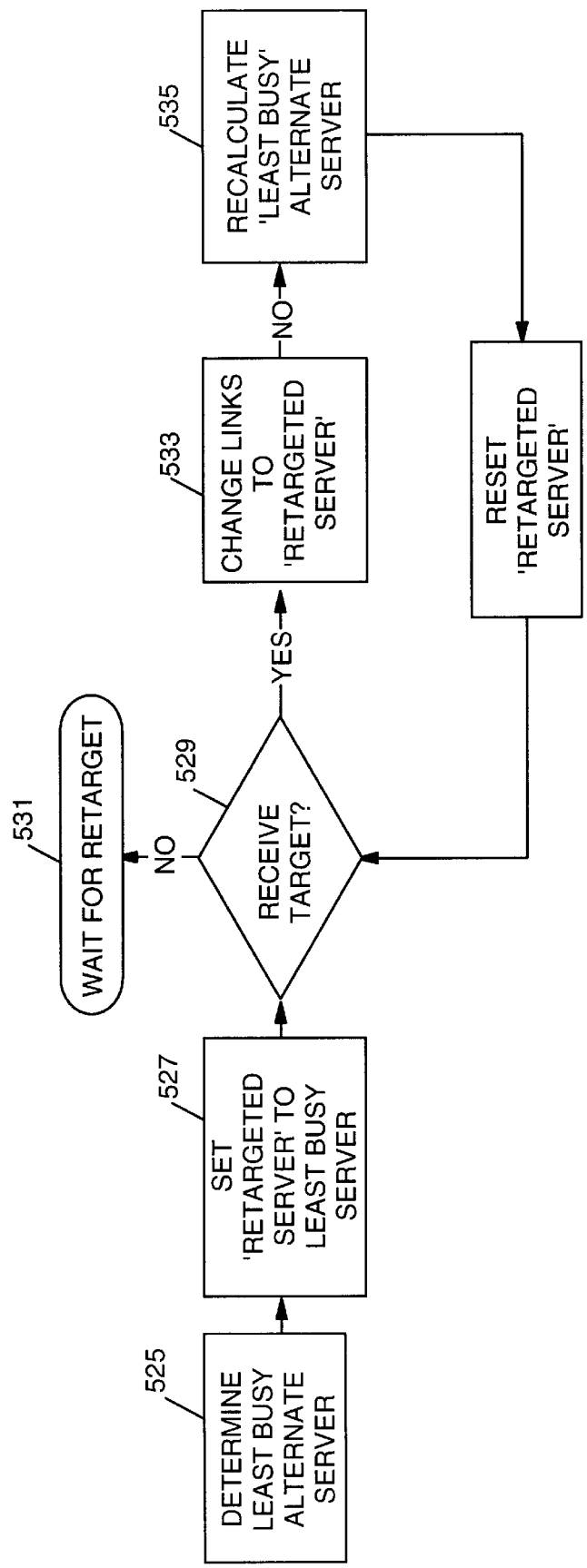
FIG. 5B is a flow chart of a least busy method of server retargeting.

FIGS. 5A and 5B are flow charts depicting alternative means of determining which alternate server to use when substituting links. While these are the two preferable alternatives at this time, the present invention can be used with any method of cycling through the alternate servers. The suggested alternatives of 'round robin' and 'least busy' are not meant to limit the present invention in any way.

FIG. 5A shows a round robin method of server retargeting simplified to address one server bank at a time. This same system is applicable to any number of server banks and can be accomplished sequentially or in parallel for each of the server banks. In FIG. 5A, a pointer for the 'retargeted server' is first set to the first alternate server (501). A check is then make to determine whether retargeting is indicated (503). If retargeting is not indicated, then the system waits for a retargeting instruction (505). If retargeting is indicated then the links in the requested web page are changed from the primary data server to the data server indicated by the 'retargeted server' pointer (507). A check is then made to determine whether the current 'retargeted server' points to the last server in the chain (509). If the 'retargeted server' points to the last server in the chain, then the 'retargeted server' pointer is set to the first alternate server (511). If the 'retargeted server' does not point to the last server in the chain, the 'retargeted server ' pointer is then incremented to point to the next available alternate server (513).

FIG. 5B depicts a least-busy method of server retargeting which can also be used for each of the banks of servers referred to from a web page. In FIG. 5B, first a query of each of the alternative servers is done to determine the least busy alternate server (525). A 'retargeted server' pointer is then set to point to the least busy alternate server (527). A check is then made to determine if a retargeting indication has been received (529). If no retargeting indication has been received then the system waits for a retargeting indication (531). If a retargeting indication has been received the internal links in the web page returned to the user are changed to indicate the web page located on the 'retargeted server' (533). The least busy alternate server is then recalculated using the most current information (535) and the 'retargeted server' pointer is reset to the currently least busy server (537).

An alternative to the preferred embodiment above allows for the internal data structures to be stored on each of the servers. This allows for the secondary data servers to also redirect requests if they become too busy.

The present invention assumes that the names of the one or more alternate servers are all the same size. This assumption simplifies the replacement of character strings within the text of the web pages. If the names of the alternate pages are different in size than that of the primary web server, then the information in the text must be padded.

Figure 6C:
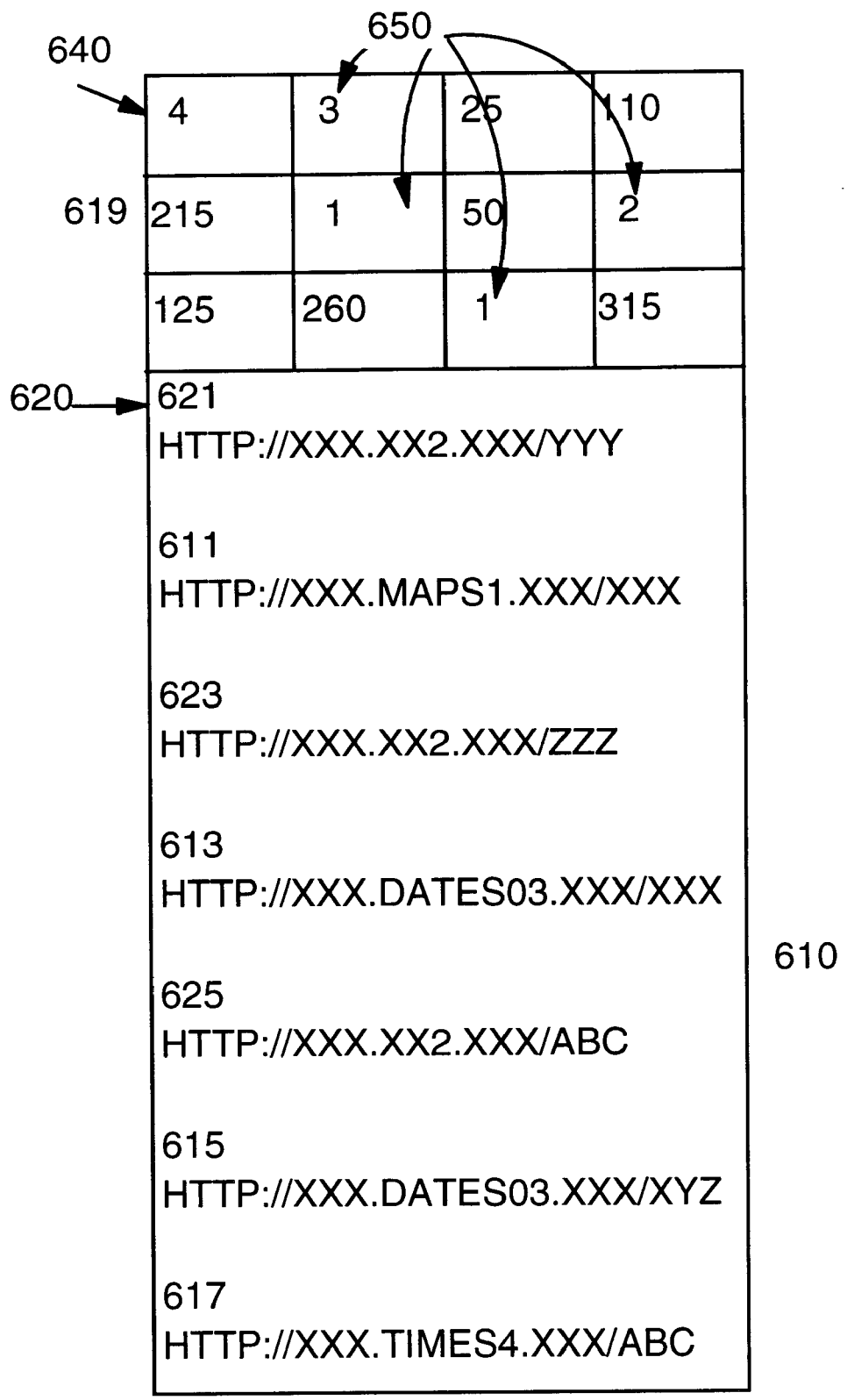
FIG. 6C is a graphical representation of a web page after the server substitution of the present invention has occurred.

FIG. 6C depicts the web page of FIG. 6B after the determination has been made that servers xxx.xx1.xxx, xxx.dates01.xxx and xxx.times1.xxx are busy and the information should be redirected to servers xxx.xx2.xxx, xxx.dates03.xxx, and xxx.times4.xxx respectively. Since a convention has been adopted for each server in this particular example that only the one or two numeric digits in the server name are different between the primary server and each of the alternate servers, the numbers represented in the header (following the count 650) can point directly to the replaceable digit(s) in the server name. Alternatively, if this convention had not been adopted, the numbers could point to the beginning of the http address and either the entire name could be replaced or the interface could be written to count to the replaceable digits.

The preferred embodiment of this invention is not meant to limit the applicability of the invention in any manner. This invention is applicable to any form of transmittable page processing where the transmitted page references other pages which have multiple instantiations on different servers.

An enhancement to the present invention allows for a feedback mechanism when one of the web servers goes down. Any of the many known feedback mechanisms can be used. When a web server goes down, the name or pointer to that failing server could be removed from the linked list of alternate servers, thereby ensuring that a user is not routed to a failing server. Additionally, the same technology can be used to include the name of the server into the linked list when it becomes available.

What is claimed is:

1. A method for balancing workload across a plurality of servers banks by dynamically retargeting page links using page headers, each of said server banks having a plurality of servers and each of said servers in a selected server bank having information replicated among them, the method comprising the steps of
preprocessing each of a plurality of pages of information stored on a first of said servers in a first of said server banks, said preprocessing comprising the steps of:
determining a count of unique servers referenced by said preprocessed page;
locating zero or more links to other pages stored on each of said unique servers, said links specified within said preprocessed page; and
appending a header to said preprocessed page, wherein said header comprises:
said count of said unique servers referenced by said preprocessed page;
for each of said unique servers, a count of said located links located within said preprocessed page for said unique server; and
for each of said located links an offset of said located link specified within said preprocessed page; and
for each of said unique servers, determining one or more alternate servers within a same server bank as said unique server, where said alternate servers are capable of providing a substitute page for said other pages, and creating and storing a data structure of references to said alternate servers.

2. The method for balancing workload across a plurality of server banks by dynamically retargeting page links using page headers according to claim 1, wherein said data structure is a linked list.

3. The method for balancing workload across a plurality of server banks by dynamically retargeting page links using page headers according to claim 1, wherein said preprocessed page and said other pages are World Wide Web pages and said plurality of servers are Web Servers.

4. The method for balancing workload across a plurality of server banks by dynamically retargeting page links using page headers according to claim 2, further comprising the steps of:
receiving a request from a user at a remote workstation for a selected one of said pages of information stored on said first server; and
for each of said unique servers represented by said count of unique servers in said header:
determining if said unique server is busy; and
if said determining step determines that said unique server is busy, selecting one of said alternate servers from said data structure created for said unique server and replacing each of said located links for said unique servers at each of said offsets with a link to said substitute page on said selected alternate server.

5. A system in a computer network for balancing workload across a plurality of server banks by dynamically retargeting page links using page headers, each of said server banks having a plurality of servers and each of said servers in a selected server bank having information replicated among them, comprising:
means for preprocessing each of a plurality of pages of information stored on a first of said servers in a first of said server banks, said preprocessing comprising:
means for determining a count of unique servers referenced by said preprocessed page;
means for locating zero or more links to other pages stored on each of said unique servers, said links specified within said preprocessed page; and
means for appending a header to said preprocessed page, wherein said header comprises:
said count of said unique servers referenced by said preprocessed page;
for each of said unique servers, a count of said located links located within said preprocessed page for said unique server; and
for each of said located links, an offset of said located link specified within said preprocessed page; and
for each of said unique servers, means for determining one or more alternate servers within a same server bank as said unique server, where said alternate servers are capable of providing a substitute page for said other pages, and creating and storing a data structure of references to said alternate servers.

6. The system for balancing workload across a plurality of server banks by dynamically retargeting page links using page headers according to claim 5, wherein said data structure is a linked list.

7. The system for balancing workload across a plurality of server banks by dynamically retargeting page links using page headers according to claim 5, wherein said preprocessed pages and said other pages are World Wide Web pages and said plurality of servers are Web Servers.

8. The system for balancing workload across a plurality of server banks by dynamically retargeting page links using page headers according to claim 5, further comprising:
means for receiving a request from a user at a remote workstation for a selected one of said pages of information stored on said first server; and
for each of said unique servers represented by said count of unique servers in said header:
means for determining if said unique server is busy; and
if said determining means determines that said unique server is busy, means for selecting one of said alternate servers from said data structure created for said unique server and replacing each of said located links for said unique servers at each of said offsets with a link to said substitute page on said selected alternate server.

* * * * *